United States Patent
Yabe

(10) Patent No.: US 7,609,365 B2
(45) Date of Patent: *Oct. 27, 2009

(54) ELECTRO-OPTICAL DISTANCE MEASURING METHOD, DISTANCE MEASURING PROGRAM AND DISTANCE MEASURING DEVICE

(75) Inventor: Masaaki Yabe, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/656,623

(22) Filed: Jan. 23, 2007

(65) Prior Publication Data
US 2008/0074636 A1    Mar. 27, 2008

(30) Foreign Application Priority Data
Sep. 21, 2006    (JP)    ................ 2006-255466

(51) Int. Cl.
*G01C 3/08* (2006.01)
(52) U.S. Cl. .................. 356/5.01; 356/4.01; 356/5.1
(58) Field of Classification Search ........... 356/4.01, 356/5.01
See application file for complete search history.

(56) References Cited

U.S. PATENT DOCUMENTS

| | | | | |
|---|---|---|---|---|
| 4,817,434 A | * | 4/1989 | Anderson | ............ 73/625 |
| 5,455,670 A | | 10/1995 | Payne et al. | ............ 356/5.1 |
| 5,898,485 A | * | 4/1999 | Nati, Jr. | ............ 356/5.08 |
| 6,023,322 A | * | 2/2000 | Bamberger | ............ 356/5.01 |
| 2003/0122078 A1 | | 7/2003 | Fritzel | ............ 250/336.1 |
| 2004/0051860 A1 | * | 3/2004 | Honda et al. | ............ 356/4.01 |
| 2006/0131486 A1 | * | 6/2006 | Land | ............ 250/221 |

FOREIGN PATENT DOCUMENTS

| | | | |
|---|---|---|---|
| JP | 5-232228 | | 9/1993 |
| JP | 05232228 A | * | 9/1993 |
| JP | 2004-144681 | | 5/2004 |
| JP | 2006-105802 | | 4/2006 |

* cited by examiner

*Primary Examiner*—Thomas H Tarcza
*Assistant Examiner*—Timothy A Brainard
(74) *Attorney, Agent, or Firm*—Nields, Lemack & Frame, LLC

(57) ABSTRACT

An electro-optical distance measuring method for measuring a distance to an object to be measured by receiving a reflected light from the object to be measured, comprising: a step of projecting a pulsed laser beam with a predetermined spreading angle so as to include two or more objects to be measured; a step of discriminating and detecting the reflected lights from the two or more objects to be measured for each emitted pulse; and a step of measuring distances to the two or more objects to be measured based on the results of detection of the discriminated reflected lights.

15 Claims, 10 Drawing Sheets

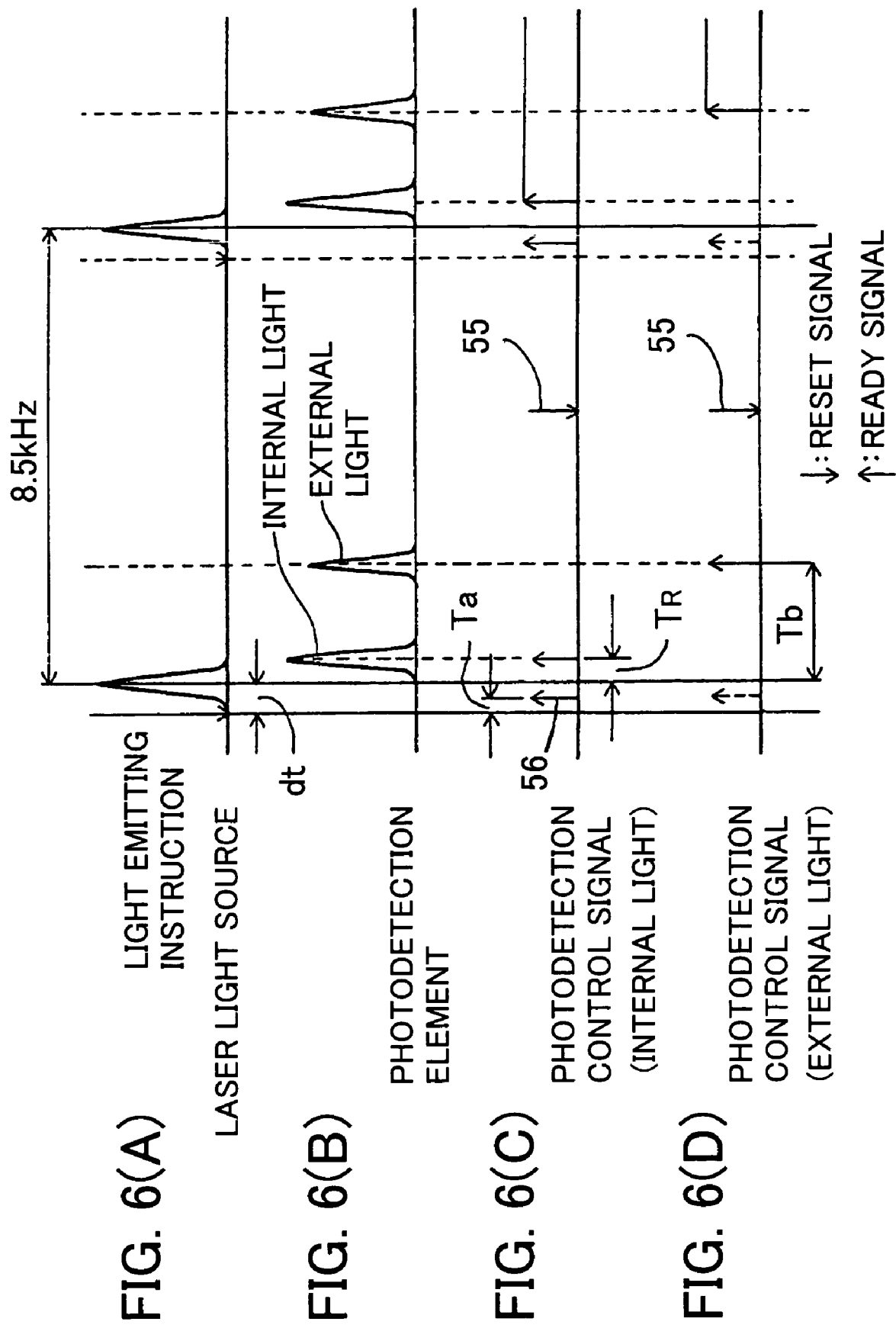

ELECTRO-OPTICAL DISTANCE MEASURING METHOD, DISTANCE MEASURING PROGRAM AND DISTANCE MEASURING DEVICE

BACKGROUND OF THE INVENTION

The present invention relates to an electro-optical distance measurement and a distance measuring device which comprises an electro-optical distance measuring unit. In particular, the present invention relates to an electro-optical distance measuring method, a distance measuring program and a distance measuring device, by which it is possible to measure distances to multiple points at one time.

An electro-optical distance measuring unit has a distance measuring light optical path for projecting a laser beam to an object to be measured and for receiving a reflected light from the object to be measured. In addition to the distance measuring light optical path, the electro-optical distance measuring unit has an internal reference light optical path, and a distance to the object to be measured is measured based on a time difference between an internal reference light received via the internal reference light optical path and a distance measuring light received via the distance measuring light optical path.

In recent years, a pulsed laser beam has been used as the laser beam for distance measurement, and photodetection time difference between the internal reference light and the distance measuring light is calculated based on the deviation of the time of pulsed light. An electro-optical distance measuring unit to be arranged on a distance measuring device is disclosed in JP-A-2004-144681, for instance. Referring to FIG. 12, brief description will be given below on the electro-optical distance measuring unit as disclosed in JP-A-2004-144681.

In FIG. 12, reference numeral 1 denotes an electro-optical distance measuring unit. The electro-optical distance measuring unit 1 comprises an optical system 2 and a measured distance calculating unit 3.

The optical system 2 has a distance measuring light optical path 4 and an internal reference light optical path 5. On the distance measuring light optical path 4, there are provided a laser light source 6, a right-angle reflection mirror 7, an objective lens 8, and a photodetection element 9. The laser light source 6 is a pulsed laser diode (PLD), for instance. From the laser light source 6, a distance measuring light, i.e. a pulsed laser beam, is emitted. The distance measuring light is deflected by the right-angle reflection mirror 7 and is projected from the electro-optical distance measuring unit 1 through the objective lens 8. The distance measuring light thus projected is reflected by an object to be measured 11, i.e. a prism. The reflected distance measuring light is entered via the objective lens 8 and is deflected and is received by the photodetection element 9.

A half-mirror 12 is arranged on the distance measuring light optical path 4. A part of the distance measuring light is reflected as an internal reference light by the half-mirror 12. The internal reference light is deflected by a reflection mirror 13, and the internal reference light optical path 5 is formed. On the internal reference light optical path 5, there are arranged relay lenses 14 and 15. After passing through the relay lens 15, the internal reference light is deflected by a reflection mirror 16. The internal reference light is reflected along the distance measuring light optical path 4 by a half-mirror 17 arranged on the distance measuring light optical path 4 and is received by the photodetection element 9.

An optical path switchover device 18 is positioned to stretch over an outgoing portion of the distance measuring light optical path 4 and the internal reference light optical path 5, and a light amount adjusting device 19 is arranged to stretch over a returning portion of the distance measuring light optical path 4 and the internal reference light optical path 5.

The optical path switchover device 18 comprises a rotary light shielding plate 21. When one of the distance measuring light optical path 4 and the internal reference light optical path 5 passes through the light shielding plate 21, the other of the optical paths is shut off by the light shielding plate 21. The rotary light shielding plate 21 is designed as to be rotated by an actuator 22 such as a motor. The light amount adjusting device 19 comprises a light amount attenuating filter 23. The light amount attenuating filter 23 is rotated by an actuator 24 such as a motor, and the light amount is adjusted so that light intensity of the distance measuring light entering the photodetection element 9 will be equal to or approximately equal light intensity of the internal reference light.

After being received by the photodetection element 9, the distance measuring light and the internal reference light are sent to the measured distance calculation unit 3 as photodetection signals.

As the result of switchover of the optical paths by the optical path switchover device 18, the distance measuring light and the internal reference light divided in time series enter alternately the photodetection element 9. From the photodetection element 9, a photodetection signal of the distance measuring light and a photodetection signal of the internal reference light are sent alternately to the measured distance calculating unit 3. At the measured distance calculating unit 3, the pulses of the distance measuring light are compared with the pulses of the internal reference light and a deviation is calculated. Based on the deviation thus obtained, a distance to the object to be measured 11 is calculated.

In the electro-optical distance measuring unit 1 of the conventional type distance measuring device as describe above, optical paths of the distance measuring light and the internal reference light are mechanically switched over by the rotary light shielding plate 21. As a result, there has been such problems that there is limitation in responsiveness and so on, and it is difficult to switch over the optical paths at high speed and to measure a distance at high speed. The distance measuring device as described in JP-A-2004-144681 is to measure one object to be measured at one time measurement, and it is not possible to measure distances to the objects to be measured at a multiple of points at the same time.

A distance measuring device for electrically switching over the photodetection of the distance measuring light and the internal reference light is disclosed in JP-A-2006-105802.

A distance measuring device, which can perform measurement on a plurality of objects to be measured at one time, is disclosed in JP-A-5-232228.

According to the distance measuring device described in JP-A-5-232228, a pulsed light is emitted, and a time (distance measuring time) from the moment of the pulsed light emission to the moment when the reflected pulsed light from the object to be measured is received is determined, and a distance to the object to be measured is measured. This distance measuring device comprises a semiconductor laser to emit the pulsed light, a photodetection element to issue a photodetection signal by receiving the pulsed light reflected from the object to be measured, time measuring circuits as many as the number of the objects to be measured and flip-flop circuits to match the time measuring circuits, and a distance value calculating device to calculate a distance to the object to be measured based on the distance measuring time. The flip-flop circuit sends a photodetection signal to the matching time measuring circuit upon receipt of the signal from the photodetection element and attains non-deliverable condition to the subsequent photodetection signal.

Therefore, a plurality of the flip-flop circuits send the photodetection signals one after another to the matching time measuring circuits and further attain the non-deliverable conditions one after another. As a result, the plurality of the time measuring circuits can individually measure the distance measuring time for each of the objects to be measured, and the distance value calculating device can measure the distance to the object to be measured based on the distance measuring time.

According to the distance measuring device as disclosed in JP-A-5-232228, it is possible to measure distances to a plurality of objects to be measured at one time.

However, according to the distance measuring device described in JP-A-5-232228, the time measuring circuit and the flip-flop circuit are required for each object to be measured. In order to perform the measurement many times to multiple points and to improve the accuracy, a great number of the time measuring circuits and the flip-flop circuits are required, and complicated circuit arrangement must be designed, and this means the increase of the costs. Also, due to the electrical switchover operation by the flip-flop circuit, response delay occurs on the circuit. As a result, there is a range where a signal cannot be measured after receiving the last receiving signal. This range is turned to a dead zone, and the problem arises in that measurement cannot be made on the objects to be measured, which are closer to each other at a distance to match the response delay time on the circuit.

SUMMARY OF THE INVENTION

It is an object of the present invention to provide a distance measuring method, a distance measuring program, and a distance measuring device, by which it is possible to perform measurement as many times as required on a plurality of objects to be measured at the same time, and also to perform distance measurement on the objects to be measured, which are positioned closer to each other.

The present invention provides an electro-optical distance measuring method for measuring a distance to an object to be measured by receiving a reflected light from the object to be measured, which the method comprises a step of projecting a pulsed laser beam with a predetermined spreading angle so as to include two or more objects to be measured, a step of discriminating and detecting the reflected lights from the two or more objects to be measured for each emitted pulse, and a step of measuring distances to the two or more objects to be measured based on the results of detection of the discriminated reflected lights. Also, the present invention provides a distance measuring method for measuring a distance to an object to be measured by receiving a reflected light from the object to be measured, which comprises a preliminary measurement and a main measurement, wherein the preliminary measurement comprises, a step of projecting a pulsed laser beam with a predetermined spreading angle so as to include two or more objects to be measured, a step of detecting reflected lights from the two or more objects to be measured for each pulse, and a step of gradually increasing a restriction time to restrict detection of the reflected lights and of measuring a restriction time to restrict detection for each of the reflected lights from the two or more objects to be measured; and wherein the main measurement comprises, a step of projecting a pulsed laser beam with a predetermined spreading angle so as to include the two or more objects to be measured, a step of restricting detection of the reflected lights based on the result of measurement by the preliminary measurement, and of discriminating and detecting the reflected lights from the two or more objects to be measured for each emitted pulse, and a step of measuring distance the two or more objects to be measured based on the result of detection of the discriminated reflected lights. Further, the present invention provides the distance measuring method as described above, wherein, in the step of discriminating the reflected lights for each emitted pulse, the reflected light received first in the pulsed laser beam is detected, the detection is restricted on the detected reflected light after the reflected light is detected at least one time, and the reflected light received first after light emission except the restricted reflected light can be detected after restriction. Also, the present invention provides the distance measuring method as described above, wherein, in the detection of the reflected lights from the two or more objects to be measured, number of detections of the reflected lights from each object to be measured is set so that the results of the detection have deviations equal to or lower than a predetermined deviation respectively.

The present invention provides a distance measuring program in a distance measuring device which comprises a light source unit for emitting a pulsed laser beam with a predetermined spreading angle, a photodetection unit for receiving reflected lights from one or more objects to be measured, a distance measuring unit for acquiring measurement data on the one or more objects to be measured based on a photodetection signal from the photodetection unit, and a control arithmetic unit for executing distance measurement by controlling the distance measuring unit and for calculating a distance based on the data acquired at the distance measuring unit, and the distance measuring program operates the control arithmetic unit so that, in case the photodetection unit receives two or more reflected lights in one pulsed laser beam, the photodetection signal obtained first in one pulsed laser beam is detected, and, after detection is performed at least one time, the detection is restricted on the detected photodetection signal, and the photodetection signal obtained first after light emission except the restricted photodetection signal can be detected after the restriction, the photodetection signal is detected by being discriminated for each emitted pulse, and distances to the one or more objects to be measured are individually measured based on the identified photodetection signal. Also, the present invention provides the distance measuring program as described above, wherein, in the detection of the photodetection signals on the one or more objects to be measured, number of detections of photodetection signals from each objects to be measured is set up so that the results of detection have deviation equal to or lower than a predetermined deviation respectively. Further, the present invention provides the distance measuring program as described above, wherein the detection is restricted by increasing time width of photodetection restriction for each pulsed laser beam by a predetermined value. Also, the present invention provides the distance measuring program as described above, wherein the detection of the photodetection signal is restricted by increasing time width of photodetection restriction by a predetermined value for each pulsed laser beam, the time width of photodetection restriction at the moment when the photodetection signal is restricted is associated with a detection signal and is stored, and the photodetection is restricted with the stored time width for the next photodetection signal.

The present invention provides a distance measuring device comprising a light source unit for emitting a pulsed laser beam having a predetermined spreading angle, a photodetection unit for receiving reflected lights from one or more objects to be measured, a photodetection control circuit, a distance measuring unit for acquiring measurement data on the objects to be measured based on a first photodetection signal from the photodetection unit, and a control arithmetic unit for carrying out distance measurement by controlling the distance measuring unit and for calculating a distance based on the data obtained at the distance measuring unit, wherein, in case the photodetection unit receives two or more reflected lights, the distance measuring unit detects the photodetection signal obtained first in one pulsed laser beam, the control arithmetic unit restricts the detection on the detected photodetection signal after detection is performed at least one time and controls the photodetection control circuit so that the photodetection signal obtained first can be detected except the restricted photodetection signal after the restriction, the photodetection signal is detected by being discriminated for each emitted pulse, and distances to one or more objects to be measured are individually measured based on the discriminated photodetection signal. Also, the present invention provides the distance measuring device as described above, wherein the control arithmetic unit controls number of detections of the photodetection signals from each objects to be measured so that the results of detection of photodetection signal of one or more objects to be measured have deviations equal to or lower than a predetermined deviation respectively. Further, the present invention provides the distance measuring device as described above, wherein the control arithmetic unit sets up a time width for photodetection restriction by detecting the photodetection signal and restricts the detection of the photodetection signal within the time width.

According to the present invention, in an electro-optical distance measuring method for measuring a distance to an object to be measured by receiving a reflected light from the object to be measured, there are provided, a step of projecting a pulsed laser beam with a predetermined spreading angle so as to include two or more objects to be measured, a step of discriminating and detecting the reflected lights from the two or more objects to be measured for each emitted pulse, and a step of measuring distances to the two or more objects to be measured based on the results of detection of the discriminated reflected lights. As a result, it is possible to measure distances many times on a multiple of objects to be measured at the same time.

Also, according to the present invention, in the step of discriminating the reflected lights for each emitted pulse, the reflected light received first in the pulsed laser beam is detected, the detection is restricted on the detected reflected light after the reflected light is detected at least one time, and the reflected light received first after light emission except the restricted reflected light can be detected after restriction. This makes it possible to measure distances many times to a multiple of objects to be measured at the same time, and also to measure distances to the objects to be measured, which are positioned closer to each other.

Further, according to the present invention, in the detection of the reflected lights from the two or more objects to be measured, number of detections of the reflected lights from each object to be measured is set so that the results of the detection have deviations equal to or lower than a predetermined deviation respectively. Thus, the measurement accuracy will be equalized when measurement is performed to a plurality of points, and this contributes to the attainment of higher reliability of the measurement.

Also, according to the present invention, in a distance measuring device which comprises a light source unit for emitting a pulsed laser beam with a predetermined spreading angle, a photodetection unit for receiving reflected lights from one or more objects to be measured, a distance measuring unit for acquiring measurement data on the one or more objects to be measured based on the photodetection signal from the photodetection unit, and a control arithmetic unit for executing distance measurement by controlling the distance measuring unit and for calculating a distance based on the data acquired at the distance measuring unit, the control arithmetic unit is operated so that, in case the photodetection unit receives two or more reflected lights in one pulsed laser beam, the photodetection signal obtained first in one pulsed laser beam is detected, and, after detection is performed at least one time, the detection is restricted on the detected photodetection signal, and the photodetection signal obtained first after light emission except the restricted photodetection signal can be detected after the restriction, the photodetection signal is detected by being discriminated for each emitted pulse, and distances to the one or more objects to be measured are individually measured based on the discriminated photodetection signal. This makes it possible to measure distances many times on a multiple of objects to be measured at the same time, and also to measure distances to the objects to be measured, which are positioned closer to each other.

Further, according to the present invention, in the detection of the photodetection signals on the one or more objects to be measured, number of detections of photodetection signals from each objects to be measured is set up so that the results of detection have deviation equal to or lower than a predetermined deviation respectively. Thus, the measurement accuracy will be equalized when measurement is performed to a plurality of points, and this contributes to the attainment of higher reliability of the measurement.

Also, according to the present invention, the detection is restricted by increasing time width of photodetection restriction for each pulsed laser beam by a predetermined value. As a result, the restriction of the detection is not limited by the arrangement of component elements, the number of the objects to be measured and the distances between the objects to be measured, etc. The photodetection restriction can be carried out in reliable manner, and the photodetection signals can be perfectly identified and discriminated.

Further, according to the present invention, the detection of the photodetection signal is restricted by increasing time width of photodetection restriction by a predetermined value for each pulsed laser beam, the time width of photodetection restriction at the moment when the photodetection signal is restricted is associated with a detection signal and is stored, and the photodetection is restricted with the stored time width for the next photodetection signal. As a result, the restriction of the detection is not limited by the arrangement of component elements, the number of the objects to be measured and the distances between the objects to be measured, etc. The photodetection restriction can be carried out in reliable manner, and the photodetection signals can be perfectly identified and discriminated.

Also, according to the present invention, in a distance measuring device comprising a light source unit for emitting a pulsed laser beam having a predetermined spreading angle, a photodetection unit for receiving reflected lights from one or more objects to be measured, a photodetection control circuit, a distance measuring unit for acquiring measurement data on the objects to be measured based on a first photodetection signal from the photodetection unit, and a control arithmetic unit for carrying out distance measurement by controlling the distance measuring unit and for calculating a distance based on the data obtained at the distance measuring unit, wherein in case the photodetection unit receives two or more reflected lights, the distance measuring unit detects the photodetection signal obtained first in one pulsed laser beam, the control arithmetic unit restricts the detection on the detected photodetection signal after detection is performed at least one time and controls the photodetection control circuit so that the photodetection signal obtained first can be detected except the restricted photodetection signal after the restriction, the photodetection signal is detected by being discriminated for each emitted pulse, and distances to one or more objects to be measured are individually measured based on the discriminated photodetection signal. This makes it possible to measure distances many times to a multiple of objects to be measured at the same time, and also to measure distances to the objects to be measured, which are positioned closer to each other.

Further, according to the present invention, the control arithmetic unit controls number of detections of the photodetection signals from each objects to be measured so that the results of detection of photodetection signal of the one or more objects to be measured have deviations equal to or lower than a predetermined deviation respectively. Thus, the measurement accuracy will be equalized when measurement is performed to a plurality of points, and this contributes to the attainment of higher reliability of the measurement.

Also, according to the present invention, the control arithmetic unit sets up a time width for photodetection restriction by detecting the photodetection signal and restricts the detection of the photodetection signal within the time width. As a result, the restriction of the detection is not limited by the arrangement of component elements, the number of the objects to be measured and the distances between the objects to be measured, etc. The photodetection restriction can be carried out in reliable manner, and the photodetection signals can be perfectly identified and discriminated.

BRIEF DESCRIPTION OF THE DRAWINGS

FIG. 6(A) is a diagram to show light emitting condition of a laser light source; FIG. 6(B) is a diagram to show photodetecting condition of a photodetection element; and FIG. 6(C) and FIG. 6(D) each represents a diagram to show photodetection timing of an internal light or an external light at the photodetection element;

DETAILED DESCRIPTION OF THE PREFERRED EMBODIMENT

Figure 1:
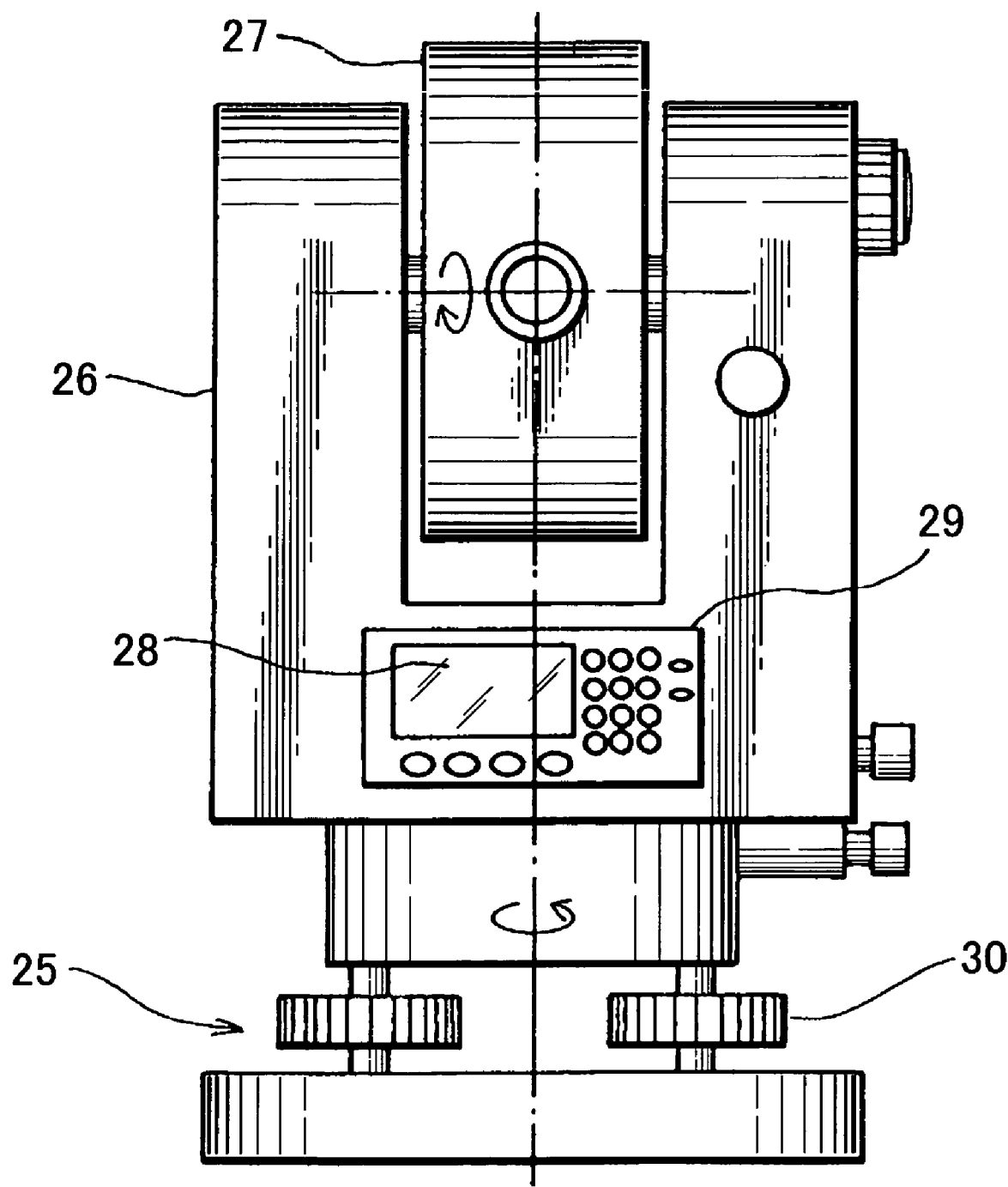
FIG. 1 is a front view of an example of a distance measuring device, in which the present invention is applied.

Description will be given below on the best mode for carrying out the present invention referring to the drawings.

Figure 2:
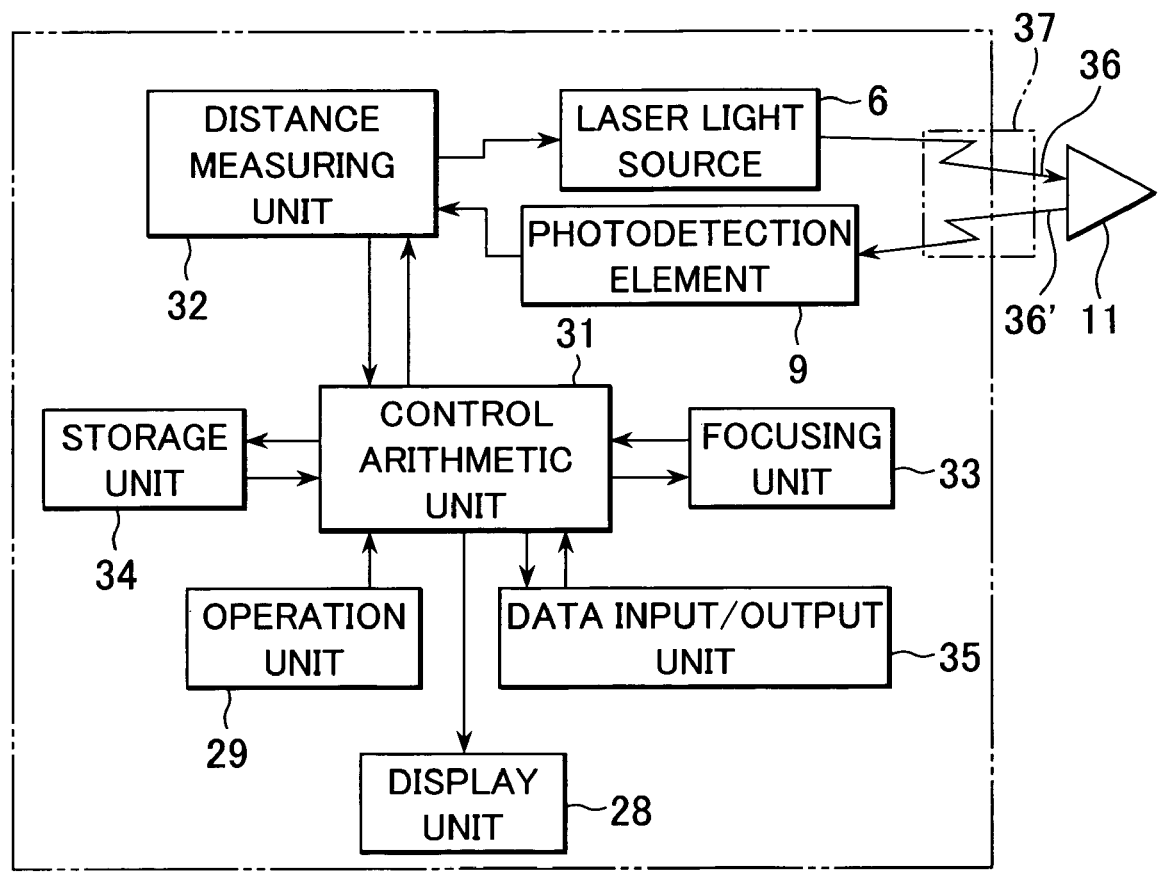
FIG. 2 is a block diagram to show general features of an embodiment of the present invention.

First, referring to FIG. 1 to FIG. 3, description will be given on a distance measuring device, in which the present invention is carried out.

A frame unit 26 is mounted on a base unit 25, which is to be installed on a tripod (not shown). A telescope unit 27 including an optical system is supported on the frame unit 26. The base unit 25 has leveling screws 30 so that the frame unit 26 can be leveled to horizontal position. The frame 26 is rotatable around a vertical axis, and the telescope unit 27 can be rotated around a horizontal axis. An operation input unit 29 with a display unit 28 is mounted on the frame unit 26, and a measured value and other data on a distance up to an object to be measured is displayed on the display unit 28.

Next, referring to FIG. 2, description will be given on approximate arrangement of the distance measuring device.

The distance measuring device comprises a control arithmetic unit 31, a distance measuring unit 32, and a focusing unit 33. A storage unit 34, a data input/output unit 35, the operation input unit 29, and the display unit 28 are connected to the control arithmetic unit 31.

The distance measuring unit 32 drives and controls a laser light source 6. From the laser light source 6, a pulsed laser beam such as infrared light, etc. with a predetermined spreading angle (e.g. about 3°) is emitted. Number of pluses of the emitted laser beam is 8000-15000 pulses/sec., e.g. 8500 pulses/sec.

The pulsed laser beam thus emitted is projected as a distance measuring light 36 to an object to be measured 11 via an optical system 37. A reflected distance measuring light 36' reflected by the object to be measured 11 is received by a photodetection element 9 via the optical system 37. A photodetection signal is inputted to the distance measuring unit 32. A distance and a time to the object to be measured 11 are calculated at the distance measuring unit 32, and the results of calculation are inputted to the control arithmetic unit 31.

In the figure, a prism is shown as the object to be measured 11, while the object to be measured may be a wall surface of a building, a surface of a natural object, etc. As many objects to be measured 11 as required are arranged within a range of the spreading angle of the distance measuring light 36. Number and arrangement of the objects to be measured being installed may be as desired. These objects can be arranged at a multiple of points and at positions closer to each other.

The focusing unit 33 is to perform automatic focusing of the telescope unit 27. Focusing operation is controlled by the control arithmetic unit 31. Focusing condition is sent to the control arithmetic unit 31 by feedback, and an approximate position of the object to be measured 11 can be obtained according to the focusing position. Various types of programs are stored in the storage unit 34. These programs include: a sequence program necessary for distance measurement operation, a distance calculating program for calculating a distance to the object to be measured according to the result of distance measurement, a distance measurement mode setting program for calculating and setting optimal measurement mode based on the result of calculation, a measurement accuracy judging program for judging variation and deviation in the measurement, etc.

The control arithmetic unit 31 controls driving of the laser light source 6, the distance measuring unit 32 and the focusing unit 33 based on the sequence program and executes the measurement, and the control arithmetic unit 31 calculates the distance based on measurement result according to the distance calculating program. The control arithmetic unit 31 develops the measurement accuracy judging program, and, based on the measurement accuracy judging program, the control arithmetic unit 31 calculates deviation of the measurement data during distance measurement and judges whether the obtained measurement data complies with the predetermined deviation as required. The calculation results, the progress of measurement, etc. are displayed on the display unit 28.

Figure 3:
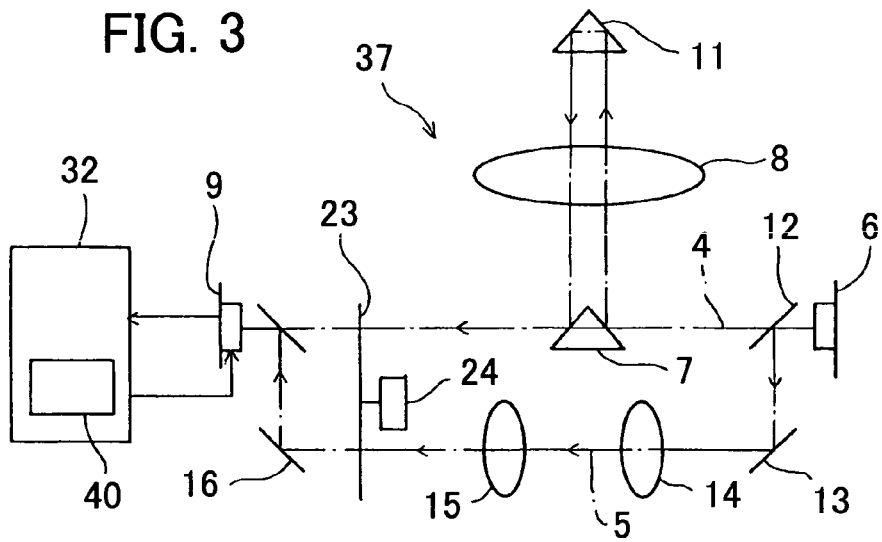
FIG. 3 is a schematical block diagram of an optical system according to the embodiment.

FIG. 3 shows an optical system 37 in the present embodiment of the invention. In FIG. 3, the same component as shown in FIG. 12 is referred by the same symbol.

Figure 12:
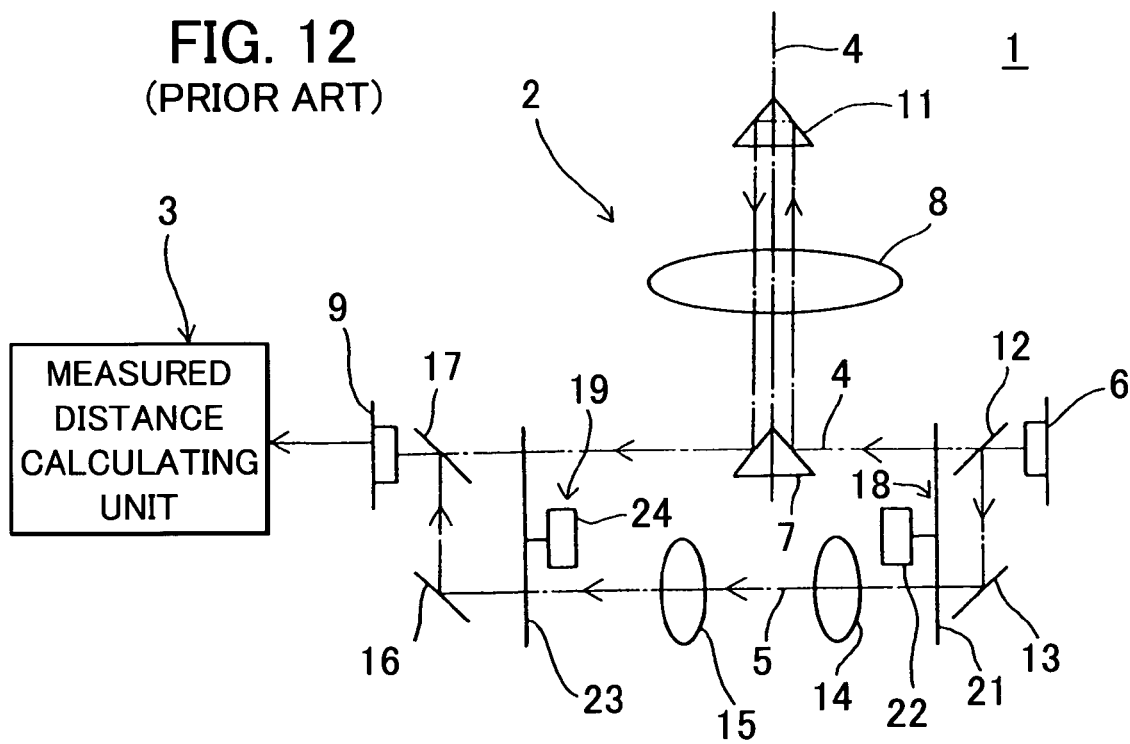
FIG. 12 is a schematical block diagram to show a conventional type optical system.

The optical system 37 of the present embodiment has approximately the same arrangement as the optical system 2 explained in FIG. 12, except that the optical path switchover device 18 is not provided in the optical system 37. An internal light and a multiple of reflected distance measuring lights 36' from the objects to be measured 11 enter the photodetection element 9 at the same time. At the photodetection element 9, detecting condition is electrically restricted by a photodetection circuit 40 of the distance measuring unit 32. The internal reference light is discriminated from the reflected distance measuring lights 36'. Further, the photodetection element 9 is controlled so that the multiple of the reflected distance measuring lights 36' are individually discriminated and detected. Photodetection signals of the internal reference light and photodetection signals of the plurality of distance measuring lights are discriminated and outputted respectively from the photodetection element 9.

Figure 4:
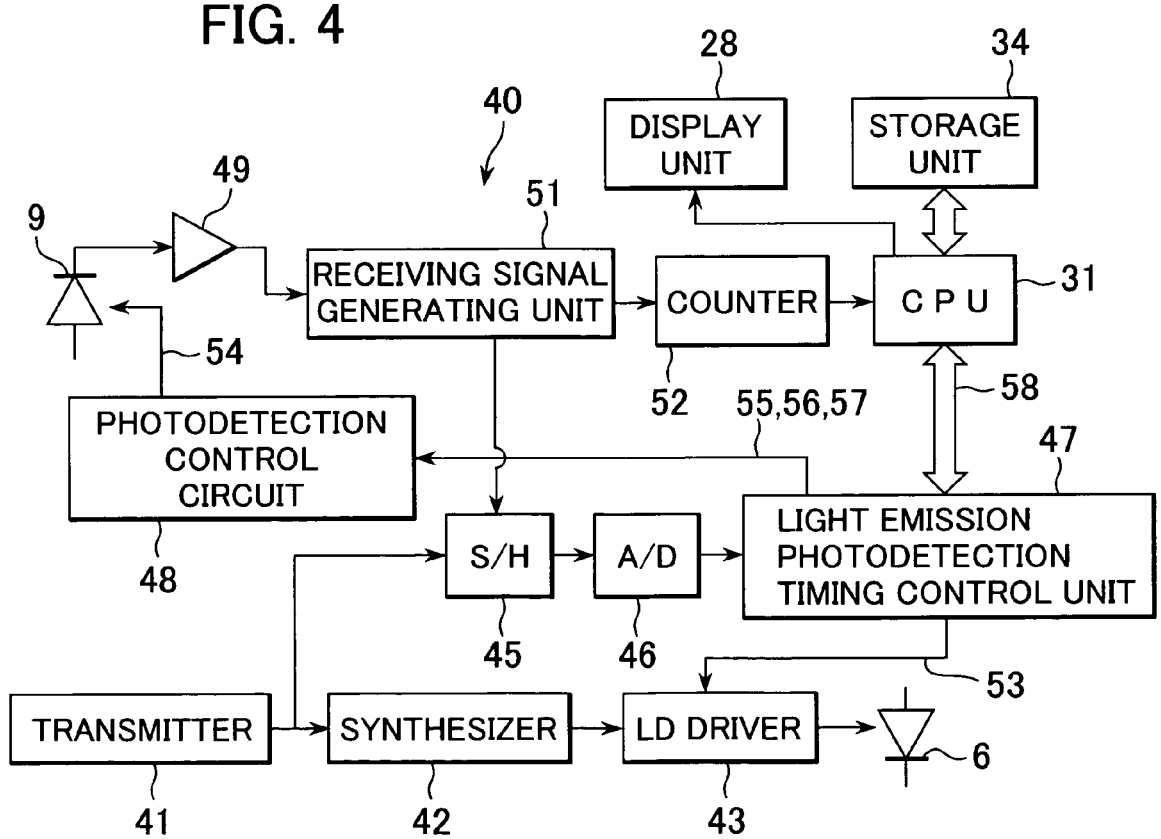
FIG. 4 is a block diagram of a photodetection circuit of the embodiment of the invention.

Now, description will be given on the photodetection circuit 40 referring to FIG. 4.

A clock signal from a transmitter 41 is converted to a pulse train signal of a certain frequency required (e.g. 8000 Hz-9000 Hz) by a synthesizer 42 and is outputted, and the pulse train signal is sent to an LD driver 43. A light emission timing control signal 53 from a light emission photodetection timing control unit 47 (to be described later) is inputted to the LD driver 43. When the light emission timing control signal 53 is inputted, the LD driver 43 drives the laser light source 6 in synchronization with the pulse train signal so that a pulsed laser beam is emitted from the laser light source 6.

The clock signal from the transmitter 41 is sent to a sample hold circuit 45. After sampling at the sample hold circuit 45, the data is converted to a digital data at an A/D converter 46, and then the data is transmitted to the light emission photodetection timing control unit 47.

A reset signal 55, a ready signal 56 (to be described later), and a mask signal 57 (to be described later) are transmitted together with the light emission timing control signal 53 from the light emission photodetection timing control unit 47, and the reset signal 55, the ready signal 56, and the mask signal 57 are inputted to a photodetection control circuit 48. Based on the reset signal 55, the ready signal 56, and the mask signal 57, the photodetection control circuit 48 controls photodetecting condition of the photodetection element 9.

As the photodetection element 9, APD (avalanche photodiode) is used, for instance. The photodetection control circuit 48 controls the detection of the photodetection signal from the photodetection element 9. The photodetection control circuit 48 issues a photodetection control signal 54 and controls the detection of the photodetection signal from the photodetection element 9 so that a first pulsed laser beam after the inputting of the ready signal 56 can be received.

In response to an instruction to emit light, the ready signal 56 is inputted with a time difference Ta (see FIG. 6). When the ready signal 56 is inputted with the time difference Ta, the photodetection element 9 can detect the receiving of the light. The internal reference light, a first receiving light, is received, and a Ref signal is issued.

When the Ref signal is detected, the mask signal 57ref is issued from the light emission photodetection timing control unit 47 to the photodetection control circuit 48, and the detection of the Ref signal is restricted by the photodetection control circuit 48. (The Ref signal is masked.) Therefore, in the pulsed laser beam emitted next, photodetection of the reflected distance measuring light 36' (time difference Tb) entering first is detected. When the photodetection (light receiving) of the reflected distance measuring light 36' is detected, the reset signal 55 is issued, and the mask by the photodetection control circuit 48 is canceled.

Optical path length of the internal reference light and characteristics on the circuit can be turned to known in advance by the adjustment, and the time difference Ta and the time difference TR can be set in advance. The timing to issue the reset signal 55 is set by giving due consideration on the factors such as light emission interval of the pulsed laser beam, the distance measurable by the surveying instrument, etc.

In case there are two or more reflected distance measuring lights 36', i.e. in case there are two or more measuring points and a plurality of reflected distance measuring lights 36 are received by the photodetection element 9 with time difference of "Tb1<Tb2 . . . <Tbn", and when the reflected distance measuring light 36' with smaller time difference Tb (e.g. Tb1) is received, a mask distance measuring light 36' with the time difference Tb1 is issued, and the photodetection of the reflected distance measuring light 36' (Tb1) after the issuing of the mask signal 57(1) is restricted.

It may be so arranged that, after a required number of the pulsed laser beams have been emitted and a required number of the reflected distance measuring lights 36' (Tb1) have been received, the mask signal 57(1) is issued and photodetection of the subsequent reflected distance measuring lights 36' (Tb1) is restricted.

When the next reflected distance measuring light 36' (Tb2) is received, a mask signal 57(2) is issued, and the detection of the reflected distance measuring light 36' (Tb2) is restricted. Consequently, the reflected distance measuring lights 36' are received and detected in the order from the one with smaller time difference. After the photodetection, the photodetection is restricted in this order, and all of the reflected distance measuring lights 36' can be individually detected.

Similarly, when the reflected distance measuring light 36' (Tbn-1) is received, a mask signal 57(n-1) is issued, and the detection of the reflected distance measuring light 36' (Tbn-1) is restricted. Therefore, the reflected distance measuring lights 36' are received and detected in the order from the one with smaller time difference. After the receiving, the photodetection is restricted in this order, and all reflected distance measuring lights 36' can be individually detected.

In case a required number of measurements are made on each of the object to be measured 11, it may be so arranged that the mask signal 57 is issued when a required number of the reflected distance measuring lights 36' on the object to be measured 11 under measurement have been detected as described above.

The photodetection signal from the photodetection element 9 is amplified by an amplifier 49, and the photodetection signal is inputted to a receiving signal generator 51. The receiving signal generator 51 judges whether the intensity of the amplified signal exceeds a predetermined level or not, i.e. whether the light is the reflected distance measuring light 36' from the object to be measured 11 or not. If it is judged that the light is the reflected distance measuring light 36', a receiving signal is issued to the sample hold circuit 45 and to a counter 52.

The sample hold circuit 45 performs sampling of the data in synchronization with the receiving signal from the receiving signal generator 51. The counter 52 counts the receiving signals, and when the number of counts reaches a predetermined value, a count signal is outputted to the control arithmetic unit 31. When the count signal is detected, the control arithmetic unit 31 issues a pulse count signal 58 to the light emission photodetection timing control unit 47.

When the pulse count signal 58 is inputted, the light emission photodetection timing control unit 47 selects and outputs the light emission timing control signal 53, the reset signal 55, the ready signal 56, and the mask signal 57.

The sampling data of the photodetection signal is inputted to the control arithmetic unit 31 via the light emission photodetection timing control unit 47. The control arithmetic unit 31 calculates a distance to the object to be measured 11 based on the sampling data, and the result of calculation is displayed on the display unit 28 as the result of distance measurement, and the result of measurement is stored in the storage unit 34.

Figure 5:
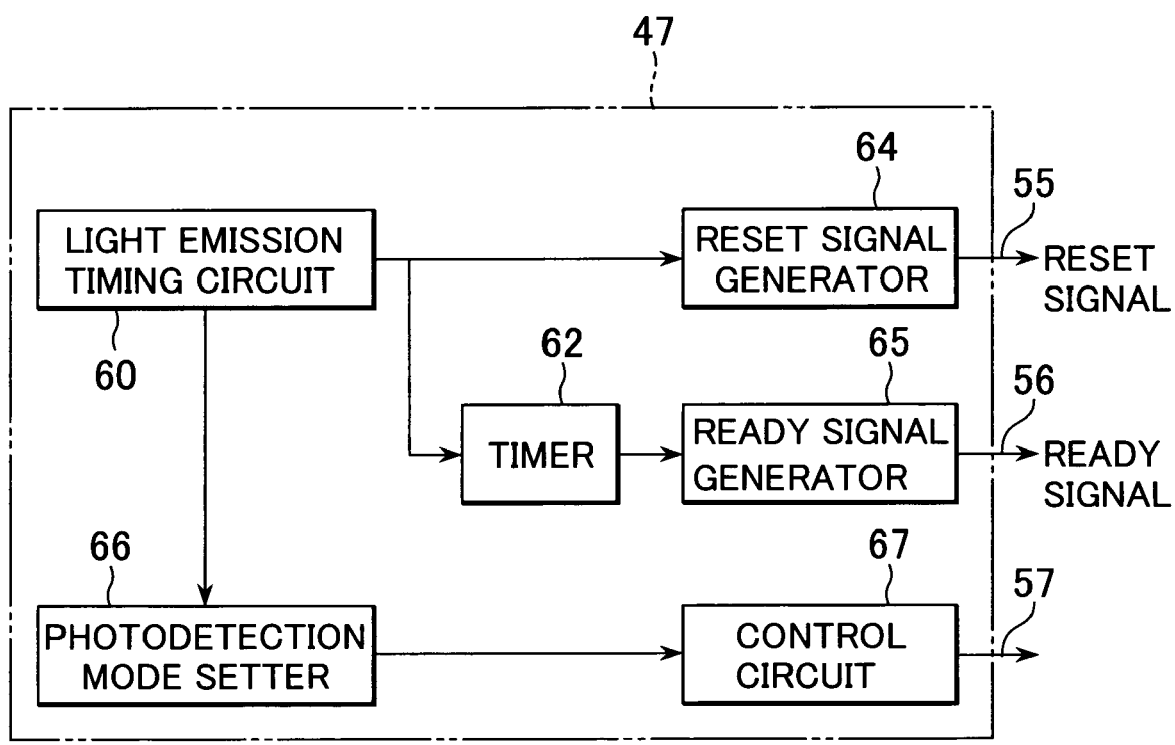
FIG. 5 is a block diagram of a light emission photodetection timing control unit of a distance measuring unit of the present embodiment.

Now, referring to FIG. 5, further description will be given on the light emission photodetection timing control unit 47.

The light emission photodetection timing control unit 47 has a light emission timing circuit 60. The light emission timing circuit 60 issues a timing signal in synchronization with the clock signal issued from the transmitter 41, and the timing signal from the light emission timing circuit 60 is issued to a reset signal generator 64 and a timer 62.

When the timing signal is inputted, the reset signal generator 64 issues the reset signal 55 after a preset time. When the timing signal is inputted, the timer 62 inputs a Ta time difference signal to a ready signal generator 65 with a time difference of Ta (See FIG. 6). The ready signal generator 65 issues the ready signal 56 in synchronization with the Ta time difference signal from the timer 62 to the photodetection control circuit 48 (see FIG. 4).

The timing signal from the light emission timing circuit 60 is also inputted to a photodetection mode setter 66. The photodetection mode setter 66 sets up a measurement mode to a control circuit 67. The control circuit 67 issues the mask signal 57 to the photodetection control circuit 48 at a timing to match the measurement mode thus being set.

As the measurement mode, there are: a measurement mode to perform measurement as many times as required on each of the objects to be measured, e.g. after measurement is performed as many times as required on one object to be measured, measurement is made as many times as required on the next object to be measured; a measurement mode to repeat as many times as required cycles of one measurement at each of the objects to be measured; a measurement mode where number of measurements is determined according to variation and accuracy of the measurement so that measurement accuracy is equalized for each of the measuring points; and so on.

Figure 7A:
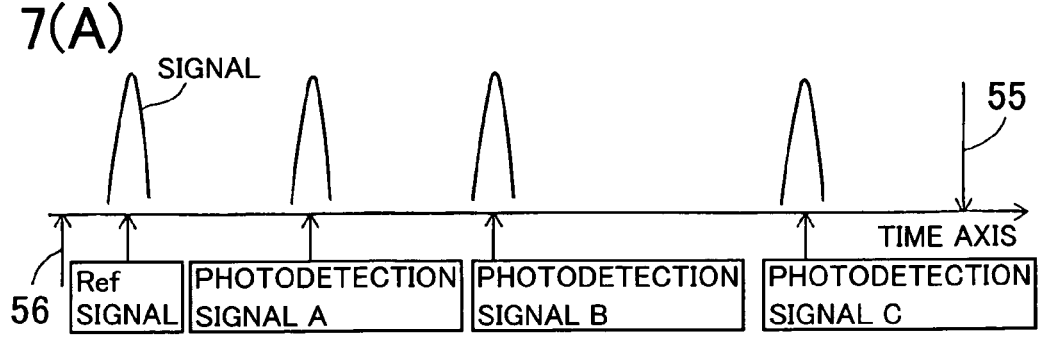
FIG. 7(A), FIG. 7(B), FIG. 7(C) and FIG. 7(D) each represents a diagram to show photodetection signals and masking conditions.
Figure 7B:
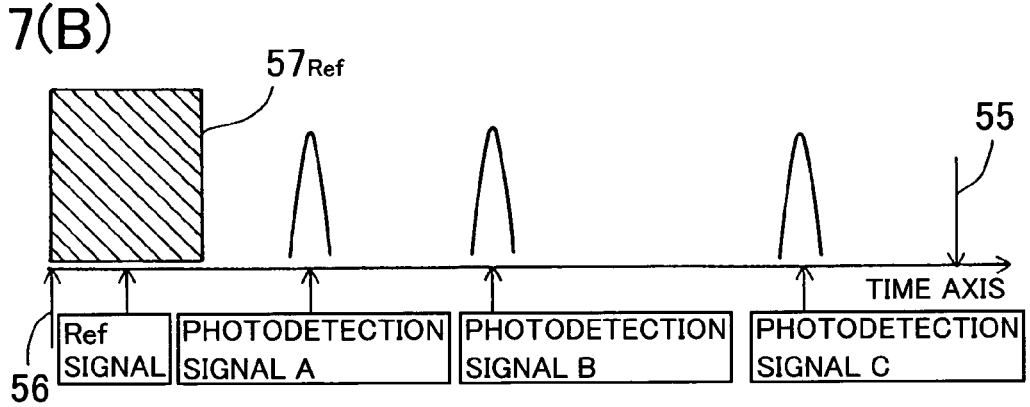
Figure 7C:
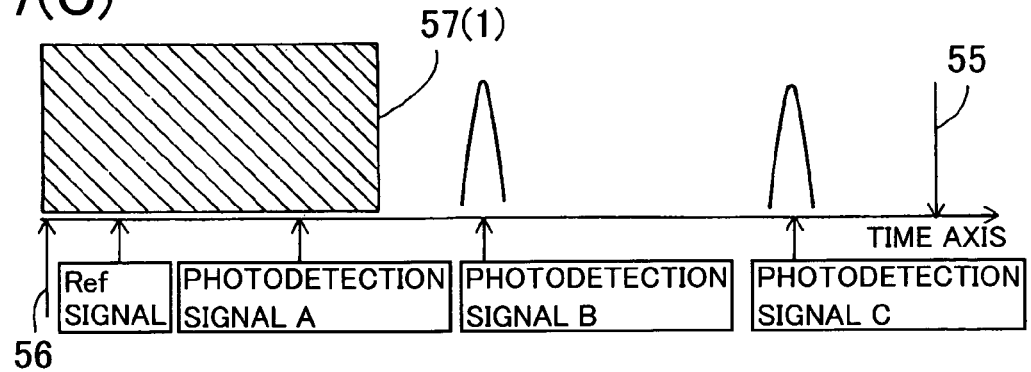
Figure 7D:
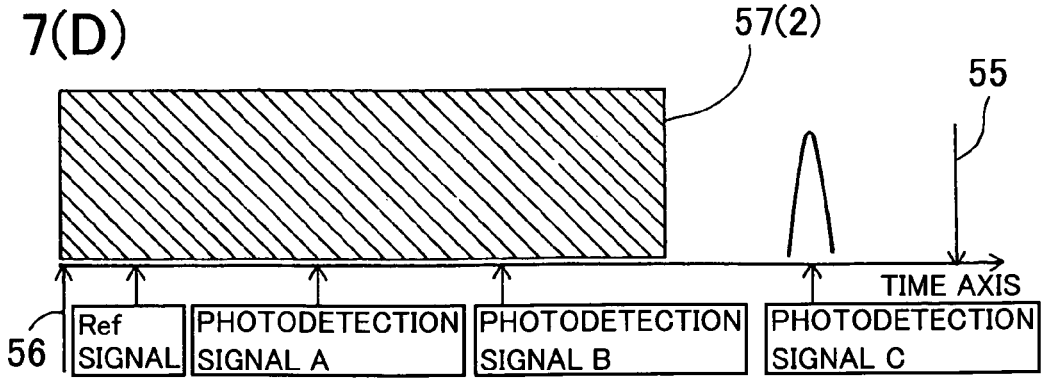
Figure 8:
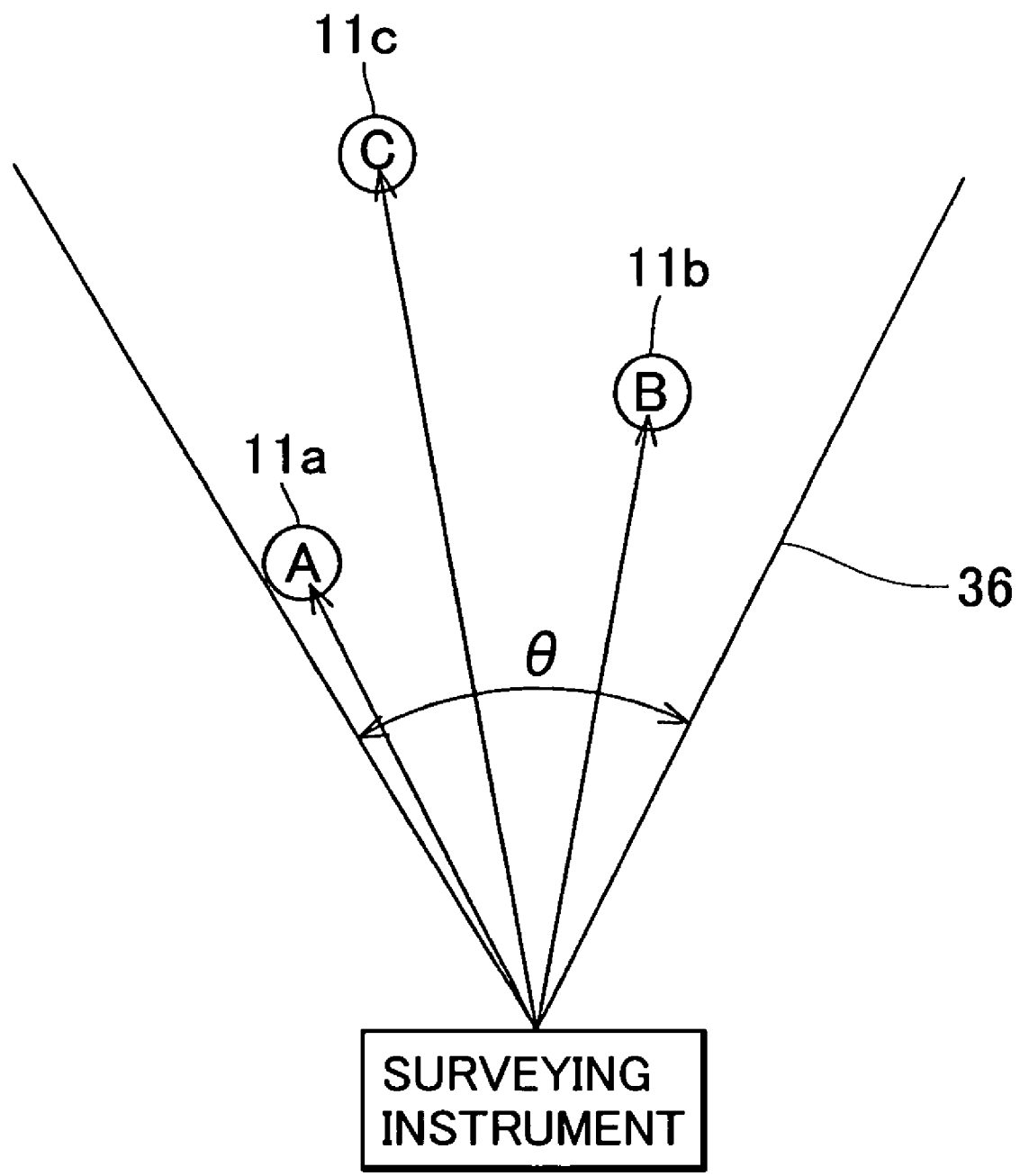
FIG. 8 is a drawing to explain relation of a surveying instrument with distance measuring lights and objects to be measured.

Referring to FIG. 6 to FIG. 8, description will be given below on operation of the photodetection circuit 40 and the light emission photodetection timing control unit 47.

As shown in FIG. 8, the distance measuring light 36 has a spreading angle $\theta$. Objects to be measured 11a, 11b and 11c are positioned within the spreading angle of $\theta$, and distances to the objects to be measured 11a, 11b and 11c are in the following relation: a distance to the object to be measured 11a<a distance to the object to be measured 11b<a distance to the object to be measured 11c.

FIG. 6 shows the relation of the reset signal 55 and the ready signal 56 with the internal light photodetection signal (Ref signal) and external photodetection signals (photodetection signals A, B, and C) of the external lights (reflected distance measuring lights 36'). FIG. 7 shows the Ref signal and the photodetection signals A, B and C and masking condition by the mask signal 57.

Based on the clock signal from the transmitter 41, a light emission instruction is issued from the LD driver 43 to the laser light source 6, and the laser light source 6 emits light. A distance to be measured by the distance measuring device is set in a range where the reflected distance measuring light is received within a cycle of the clock signal. The clock signal is issued with a cycle of 8.5 kHz (approx. 120 μs), for instance.

From the laser light source 6, a pulsed laser beam is emitted with 8.5 kHz. The emitted pulsed laser beam has a peak with a delay of dt from the light emission instruction, for instance.

When the pulsed laser beam is emitted, an internal reference light (hereinafter referred as "internal light") first enters the photodetection element 9 via the internal reference light optical path 5 with a delay of TR from the peak of the pulsed laser beam. Next, the reflected distance measuring light 36' (hereinafter referred as "external light") from the object to be measured 11 enters with a delay of Tb from the peak of the pulsed laser beam. From the photodetection element 9, photodetection signals of the internal light and the external light as shown in FIG. 6(B) are issued. For convenience purpose, one photodetection signal by the external light is shown in FIG. 6(B). However, under the condition that the detection of the photodetection signal is not restricted in the photodetection control circuit 48, the internal light and all of the external lights enter the photodetection element 9 as shown in FIG. 7(A), and the photodetection signals are issued respectively.

The clock signal from the transmitter 41 is also inputted to the light emission photodetection timing control unit 47. Based on the clock signal, a timing signal in synchronization with the light emission instruction is issued from the light emission timing circuit 60. When the timing signal is inputted, the reset signal generator 64 issues the reset signal 55 at, for instance, ¾ of the cycle of the clock signal, and the reset signal 55 is sent to the photodetection control circuit 48.

When the timing signal is inputted, the timer 62 issues a Ta time difference signal with a delay of Ta from the light emission instruction to the ready signal generator 65.

In the photodetection mode setter 66, a detection mode of the photodetection signal to match the measurement mode is set in advance. That is, it is set under which condition the Ref signal and the photodetection signals A, B and C from the photodetection element 9 are to be detected, and the control circuit 67 controls the timing to issue the mask signal 57 in accordance with the detection mode as set in the photodetection mode setter 66.

For instance, when the ready signal 56 based on the Ta time difference signal is inputted to the photodetection control circuit 48, the photodetection control circuit 48 makes it possible to detect from the photodetection element 9 at the ready signal 56 and after (i.e. after the elapse of the time Ta from the light emission instruction). The value of Ta is set as: Ta<dt (see FIG. 6(C)). The photodetection control circuit 48 controls the photodetection signal from the photodetection element 9 so that only the first signal after the ready signal 56 can be detected. Therefore, the photodetection element 9 can receive only one internal light with regard to one pulsed laser beam. After receiving only one internal light, the condition of the photodetection element 9 is reset according to the reset signal 55. Further, the photodetection element 9 is turned to the ready condition according to the ready signal 56. Thus, the photodetection element 9 can receive the light again (See FIG. 6(C)).

From the time when the reset signal 55 is inputted to the photodetection control circuit 48 to the time when the ready signal 56 is inputted to the photodetection control circuit 48, the photodetection of the photodetection element 9 is equivalent to an electricaly masked condition (see FIG. 7(B)), and the detection of disturbance light is prevented.

Next, when the Ref signal is detected, the mask signal 57ref is issued from the control circuit 67 to the photodetection control circuit 48 and masking is made by the photodetection circuit 48 so that the Ref signal is not detected (FIG. 7(B)).

When the Ref signal is masked, it is possible to detect the photodetection signals A, B and C of the reflected distance measuring lights 36' from the objects to be measured 11a, 11b, and 11c (see FIG. 6(D) and FIG. 7(B)).

In the next pulsed light, the reflected distance measuring lights 36' from the objects to be measured 11a, 11b and 11c enter the photodetection element 9 respectively, and the photodetection signal A, the photodetection signal B and the photodetection signal C are issued. With the photodetection element 9 in masked condition, the photodetection signal of the first reflected distance measuring light 36' can be detected. Therefore, the photodetection signal A emitted first is detected. By determining the time difference between the Ref signal and the photodetection signal A, a distance to the object to be measured 11a can be determined.

As the photodetection signal A is received, the light emission timing circuit 60 calculates the time to restrict the detection of the photodetection signal A when the photodetection signal A is received next based on the time to receive the photodetection signal A, and the result of calculation is outputted to the photodetection mode setter 66. The photodetection mode setter 66 issues a mask signal issuing instruction to match the measurement mode to the control circuit 67. The control circuit 67 issues a mask signal 57(1) to the photodetection control circuit 48.

The mask signal 57(1) restricts the detection of the photodetection signal until the moment later than the moment when the photodetection signal A is issued by the next pulsed light, and the detection of the photodetection signal A is masked (See FIG. 7(c)).

During the period when the mask signal 57(1) is not issued, the photodetection signal A is continuously detected each time the pulsed laser beam is emitted. By setting the number of detections as set according to the measurement mode at the photodetection mode setter 66, and by arranging that the mask signal 57(1) is issued when the number of detections reaches the preset value, it is possible to perform measurement as many times as required to the object to be measured 11a.

By masking the photodetection signal A, it is possible to detect the photodetection signal B (FIG. 7(C)), and the photodetection signal B is detected when the next pulsed light is emitted. Based on the time difference between the photodetection signal B and the Ref signal, a distance to the object to be measured 11b is calculated.

When the photodetection signal B is received, the light emission timing circuit 60 calculates the time to restrict the detection of the photodetection signal B when the photodetection signal B is received next based on the time when the photodetection signal B is received, and a mask signal 57(2) for the photodetection signal B is issued to the photodetection control circuit 48 via the photodetection mode setter 66 and the control circuit 67. As the mask signal 57(2) is issued, the detection of the photodetection signal B is restricted and it is possible to detect the photodetection signal C (FIG. 7(D)). Similarly, the time difference to the photodetection signal C is detected, and a distance is calculated from the time difference between the photodetection signal C and the Ref signal.

When the measurement is performed as many times as required on the objects to be measured 11b and 11c, the timing of the mask signal 57 as issued from the control circuit 67 should be controlled as described above.

By emitting the first pulsed light and by receiving the reflected light, number of the objects to be measured 11 can be identified. Based on the result of measurement, it is possible to confirm that measurement has been completed to all of the objects to be measured 11. When the measurement has been completed, sequence of the mask signal generation of the light emission timing circuit 60 is reset.

The mask signal 57 is issued when the reflected distance measuring light 36' has been received, and there is no restriction on the number of the objects to be measured 11. The masking time is determined by calculation, and only the time to restrict the detection of the photodetection signal of interest would suffice. Thus, it is possible to mask even when the photodetection signals are closer to each other in terms of time. Specifically, even when the objects to be measured 11 are at the positions closer to each other, the photodetection signals can be discriminated, and measurement can be performed.

Next, referring to FIG. 9 and FIG. 10, description will be given on the flow of distance measurement according to the present invention.

The distance measurement consists of a preliminary measurement and a main measurement.

Figure 9:
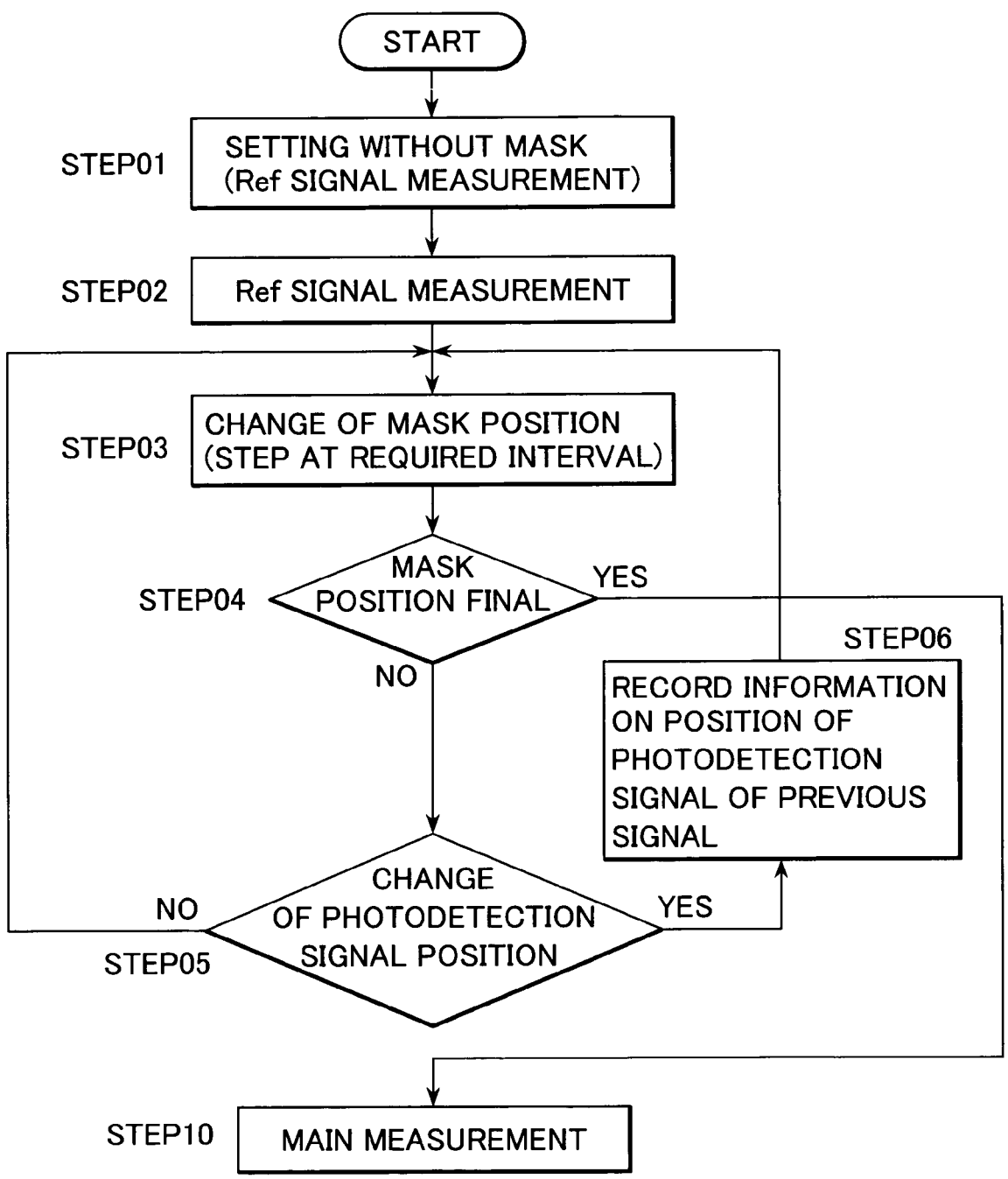
FIG. 9 is a flow chart of a preliminary measurement according to the present invention.
Figure 10:
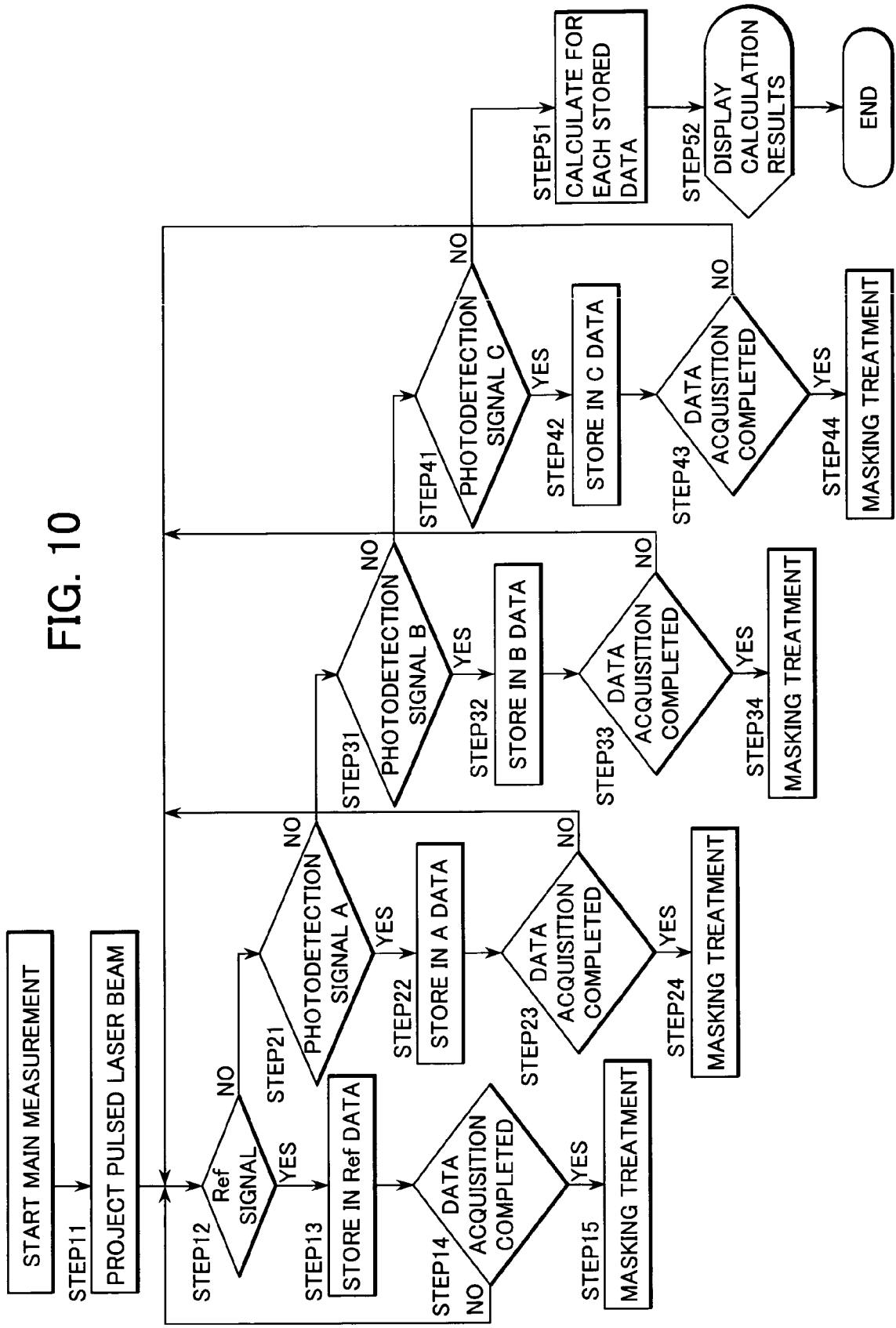
FIG. 10 is a flow chart of a main measurement according to the present invention.

As shown in FIG. 9, an information on the mask to discriminate and identify the photodetection signals is obtained by the preliminary measurement.

When the execution of the preliminary measurement is indicated, a surveying instrument starts to operate under the condition where the detection of the photodetection signal is not restricted.

(Step 01) A pulsed laser beam is emitted. The internal light and the reflected distance measuring lights 36' from the objects to be measured 11a, 11b and 11c are received, and the Ref signal by the internal light is detected first.

(Step 02) The time difference TR is measured on the Ref signal. Based on the time difference TR, the mask signal 57Ref is calculated. A time TRef set up by the mask signal 57Ref (i.e. time width of the mask) is in the relation of: TRef>TR. The time TRef takes a value bigger than the time up to the extinction of the Ref signal or the time up to the moment when the Ref signal is turned to a threshold value or lower than a threshold value to be detected. Thus, the detection of the photodetection signal up to the time TRef is restricted. That is, the detection is masked up to the time TRef.

(Step 03) The Ref signal is masked by the mask signal 57Ref. Under the condition that the reflected distance measuring light 36' from the object to be measured 11 is received, a mask with time width bigger by $\Delta t$ for each pulse than the time TRef is set up. That is, after "n" number of pulsed laser beams, a mask with time width of "TRef+n$\Delta t$" is set up.

(Step 04) Each time the time width of the mask is changed, it is checked whether the change is final or not. This judgment is made depending on whether there is a photodetection signal by the next pulsed laser beam after changing the mask width or not.

(Step 05) In case there is a photodetection signal, it is confirmed whether there is a change of time position of the photodetection signal or not based on the photodetection time. If it is judged that there is no change, it should be brought back to the procedure in Step 03, and the increase of time width of the mask is continued.

If it is judged that there is a change in time position of the photodetection signal, it means that the photodetection signal by the reflected distance measuring light 36' of the object to be measured 11a is masked due to the increase of mask width.

(Step 06) If it is judged that there is a change in time position of the photodetection signal, the position of the masked signal in Step 04 (e.g. Time T(1) of the photodetection signal A) is stored, and the mask width when the photodetection signal A is masked is stored. Further, going back to Step 03, the increase of the mask width is continued so that the next photodetection signal is masked.

As described above, when the mask width is increased at the step as required, the photodetection signals are masked in the order from the object to be measured 11 at shorter distance. The time position (position in terms of time) of the photodetection signal at the moment when the photodetection signal has been masked, and further, the time width of the mask are stored. The time width of the mask to be stored with respect to each photodetection signal is associated with the mask signal 57. When the mask signal 57 is issued, the masking to restrict the detection of the photodetection signal with the matching mask time width is executed.

In case the next photodetection signal is not detected after the photodetection signal has been masked, it means that the increase of the mask width has been completed. Thus, the preliminary measurement is terminated, and it is advanced to the main measurement (Step 10).

When the time width of the mask is set up, it may be so arranged that the photodetection signal is masked and the time of the next photodetection signal to be received after masking is measured, and that the time width of the mask for the next photodetection signal is set up based on the measuring time. As such arrangement, the time of the photodetection signal may be measured and the mask width may be sequentially set up based on the measuring time.

In the preliminary measurement as described above, the approximate positions of the objects to be measured 11a, 11b, and 11c and the time widths of the mask to identify and discriminate the reflected lights from the objects to be measured 11a, 11b and 11c are measured and stored. Also, data storage regions for storing the data of the internal reference light and the data for each of the objects to be measured 11a, 11b and 11c are provided in the storage unit 34 (see FIG. 4).

Now, referring to FIG. 10, description will be given on the main measurement.

(Step 11) A pulsed laser beam is projected.

(Step 12) Because it is unmasked condition, the Ref signal is detected.

(Step 13) The time is measured on the Ref signal, and the result of measurement is stored in a Ref signal storage region of the storage unit 34.

(Step 14) In case the acquisition and the storage of the data are not confirmed, measurements and the acquisition of the data on the Ref signal are also performed on the next pulsed laser beam. The number of the acquisitions of the data is controlled according to the measurement mode of the photodetection mode setter 66. In the initial setting, it is set to 1 or to a predetermined number. When as many times of the acquisitions and the storage as the preset number in the initial setting have been completed, it is judged that the acquisition of the data has been completed.

(Step 15) When the acquisition and the storage of the data have been confirmed, the mask signal 57 is issued, and masking is made on the Ref signal.

(Step 21) When masking is made on the Ref signal, the detection of the Ref signal is restricted. Thus, the photodetection signals obtained by the pulsed laser beam emitted next are related to the objects to be measured 11a, 11b and 11c. Thus, the photodetection signal on the object to be measured 11a, which is issued first, is detected.

(Step 22 and Step 23) The time is measured with regard to the photodetection signal A. The data is acquired and the data is stored in a photodetection signal A storage region. As many data as required are acquired according to the measurement mode. When as many data as preset number have been acquired and stored, it is judged that the acquisition of the data of the photodetection signal A has been completed.

(Step 24) When the acquisition of the data has been completed, a mask signal 57 is issued, and the masking is made on the photodetection signal A.

(Step 31) When the photodetection signal A is masked, the photodetection B is detected for the next pulsed laser beam. On the photodetection signal B, the same procedures as in the photodetection signal A (Step 32 and Step 33) are performed. In Step 34, masking is performed on the photodetection signal B.

(Step 41) When the photodetection signal B is masked, the photodetection signal C is detected for the next pulsed laser beam. On the photodetection signal C, the same procedures as in the photodetection signal A (Step 42 and Step 43) are performed. In Step 44, masking is carried out on the photodetection signal C.

(Step 41) When masking has been performed on all of the photodetection signals, there is no more signal to be detected, and it is shifted to Step 51.

(Step 51 and Step 52) When the acquisition of the data has been completed to all of the objects to be measured 11a, 11b and 11c, distance is calculated for each stored data. The result of calculation is stored in the storage unit 34, and the result of calculation is displayed on the display unit 28.

In the above, the measurement consists of the preliminary measurement and the main measurement. However, if approximate positions of the objects to be measured 11a, 11b and 11c are known, the time widths of masking to the objects to be measured 11a, 11b and 11c may be set by key input from the operation input unit 29, and the preliminary measurement may not be performed.

The approximate positions of the objects to be measured 11a, 11b and 11c can be determined according to the focusing position of the focusing unit 33. In the above, the number of the objects to be measured is set to three (i.e. 11a, 11b and 11c), while there is no restriction on the number of the objects to be measured so far as the objects to be measured 11 are within the range of the spreading angle θ of the distance measuring light 36.

In the data obtained for the objects to be measured 11a, 11b and 11c, there are variations due to the distance and the optical path conditions to each of the objects to be measured 11a, 11b and 11c, and all of the data do not necessarily have the same deviation and the same accuracy.

In case the same deviation and the same accuracy are required, it is set up according to the distance measurement mode setting program so that the measurement accuracy judging program to judge variation and deviation of the measurement is operated during the measurement. Or, in case the distance measurement is automatically performed, it is so arranged that the measurement accuracy judging program is started.

Figure 11:
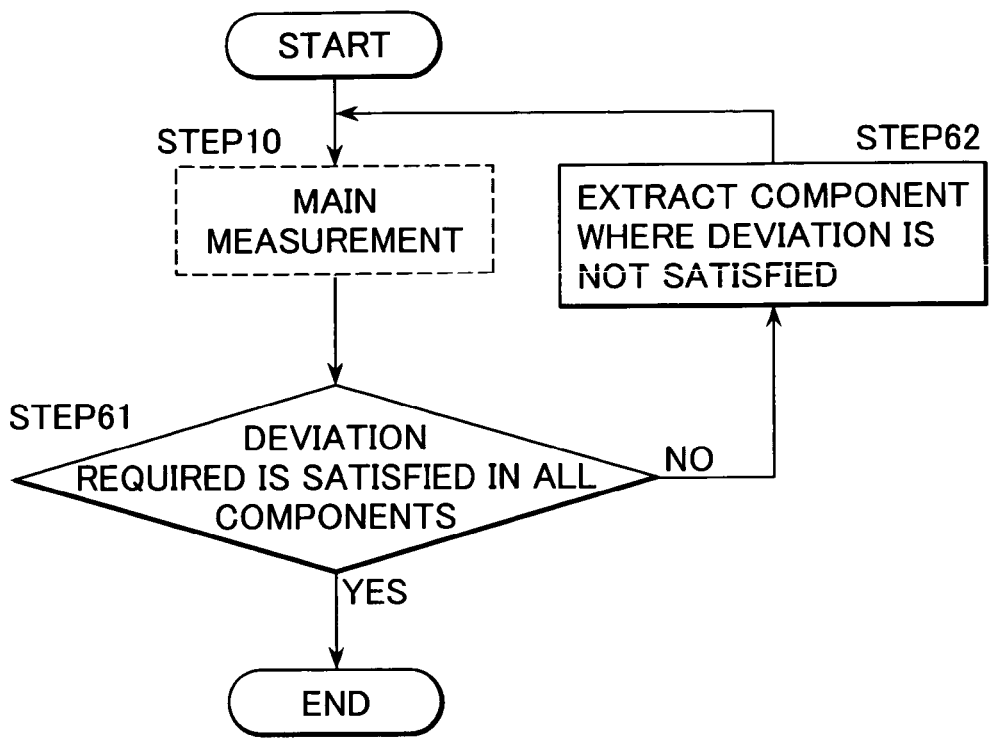
FIG. 11 is a flow chart in case judgment is made on measurement accuracy in the measurement according to the present invention.

Referring to FIG. 11, description will be given on the flow of measurement under the condition that the measurement accuracy judging program is started.

(Step 10) The measurement accuracy judging program supervises deviation and variation of the data relating to the photodetection signals A, B and C stored in the data storage regions during the period when the main measurement is carried out.

(Step 61) In case the deviation of each data satisfies the deviation as required, the main measurement is terminated straightly.

In case the deviation of each data does not satisfy the deviation as required, the main measurement is carried out again.

In case the main measurement is carried out, weighting is put on data acquisition depending on the extent of the deviation. For instance, when the deviation of the photodetection signal B is big, the number of data acquisitions in Step 31 is increased to the number more than that of the other photodetection signals A and C. For instance, the number is increased to a number two times as many as the number of the acquisition of the photodetection signal A and the photodetection signal C, or the like. The number of acquisitions is set at the photodetection mode setter 66.

When the data of the previous main measurement is used, the data is acquired on the object to be measured 11 with higher deviation. For instance, when the measurement data is acquired on the object to be measured 11b, the photodetection signal A is masked so that the photodetection data B can be detected. The mask signal 57 to mask the photodetection signal A is issued via the control circuit 67. The number of the data to be additionally acquired is set up via the photodetection mode setter 66 based on the conditions of deviation.

By installing the surveying instrument and by emitting the pulsed laser beam, distance measurement can be performed at the same time and with similar accuracy on a multiple of objects to be measured 11.

What is claimed is:

1. An electro-optical distance measuring method for measuring a distance to an object to be measured by receiving a reflected light from the object to be measured, comprising:

a step of projecting a laser beam which consists of pulses sequentially emitted with a predetermined spreading angle so as to include two or more objects to be measured;

a step of receiving the reflected lights from the two or more objects to be measured by a photodetection unit via the same optical path for each pulse of the pulsed laser beam;

a step of discriminating and detecting the reflected light from one of said two or more objects to be measured;

a step of discriminating and detecting the reflected lights from said two or more objects to be measured respectively; and a step of measuring distances to said two or more objects to be measured respectively based on the results of detection of the discriminated reflected lights; wherein, in the step of discriminating said reflected lights for each emitted pulse, the reflected light received first in one emitted pulse is detected, the detection is restricted on the detected reflected light after the reflected light is detected at least one time, and the reflected light received first after light emission except the restricted reflected light can be detected after restriction.

2. An electro-optical distance measuring method for measuring a distance to an object to be measured by receiving a reflected light from the object to be measured, comprising a preliminary measurement and a main measurement, wherein said preliminary measurement comprises:

a step of projecting a laser beam which consists of pulses sequentially emitted with a predetermined spreading angle so as to include two or more objects to be measured;

a step of receiving the reflected lights from said two or more objects to be measured for each pulse of the pulsed laser beam;

a step of setting a restriction time to restrict detection of the reflected lights;

a step of gradually increasing the restriction time being set to restrict detection of the reflected lights;

a step of detecting the reflected light received first after lapse of the restriction time to restrict detection each time the restriction time to restrict detection is increased; and a step of measuring the restriction time to restrict detection for each of the reflected lights from said two or more objects to be measured, and wherein said main measurement comprises:

a step of projecting a laser beam which consists of pulses sequentially emitted with a predetermined spreading angle so as to include said two or more objects to be measured; and a step of changing the restriction time to restrict detection of the reflected lights depending on the object to be measured based on the result of measurement by said preliminary measurement, a step of detecting the reflected light received first after the lapse of the restriction time to restrict detection each time the restriction time to restrict detection is changed, a step of discriminating the reflected lights from said two or more objects to be measured for each emitted pulse of the laser beam, and of measuring distances to said two or more objects to be measured respectively based on the result of detection of the discriminated reflected lights.

3. An electro-optical distance measuring method according to claim 2, wherein, in the step of discriminating said reflected lights for each emitted pulse, the reflected light received first in one emitted pulse is detected, the detection is restricted on the detected reflected light after the reflected light is detected at least one time, and the reflected light received first after light emission except the restricted reflected light can be detected after restriction.

4. An electro-optical distance measuring method according to claim 1 or 2, wherein, in the detection of the reflected lights from said two or more objects to be measured, number of detections of the reflected lights from each object to be measured is set so that the results of the detection have deviations equal to or lower than a predetermined deviation respectively.

5. A distance measuring program in a distance measuring device which comprises a light source unit for emitting a laser beam which consists of pulses sequentially emitted with a predetermined spreading angle, a photodetection unit for receiving reflected lights from one or more objects to be measured, a distance measuring unit for acquiring measurement data on said one or more objects to be measured based on a photodetection signal from said photodetection unit, and a control arithmetic unit for executing distance measurement by controlling said distance measuring unit and for calculating a distance based on the data acquired at said distance measuring unit, wherein said distance measuring program operates said control arithmetic unit so that, in case said photodetection unit receives two or more reflected lights in one emitted pulse of the pulsed laser beam, the photodetection signal obtained by the reflected light received first in one emitted pulse is detected; in the next emitted pulse after the photodetection signal is detected at least one time, the detection of the reflected light received first is restricted; after the restriction, the photodetection signal obtained by the reflected light received first after the lapse of the restriction time can be detected; by increasing the restriction time, one reflected light of the reflected lights obtained by one emitted pulse is detected by being discriminated for each object to be measured; and distances to said one or more objects to be measured are individually measured based on the detected photodetection signal.

6. A distance measuring program according to claim 5, wherein, in the detection of the photodetection signals on said one or more objects to be measured, number of detections of photodetection signals from each objects to be measured is set up so that the results of detection have deviation equal to or lower than a predetermined deviation respectively.

7. A distance measuring program according to claim 5, wherein the detection is restricted by increasing time width of photodetection restriction for each emitted pulse by a predetermined value.

8. A distance measuring program according to claim 5, wherein the detection of the photodetection signal is restricted by increasing time width of photodetection restriction by a predetermined value for each emitted pulse, the time width of photodetection restriction at the moment when the photodetection signal is restricted is associated with a detection signal and is stored, and the photodetection is restricted with the stored time width for the next photodetection signal.

9. A distance measuring device, comprising a light source unit for emitting a laser beam which consists of pulses sequentially emitted having a predetermined spreading angle, a photodetection unit for receiving reflected lights from one or more objects to be measured, a photodetection control circuit, a distance measuring unit for acquiring measurement data on said objects to be measured based on a first photodetection signal from said photodetection unit in one emitted pulse, and a control arithmetic unit for carrying out distance measurement by controlling said distance measuring unit and for calculating a distance based on the data obtained at said distance measuring unit, wherein, in case said photodetection unit receives two or more reflected lights in one emitted pulse said distance measuring unit detects the photodetection signal obtained first in one emitted pulse, said control arithmetic unit restricts the detection on the detected photodetection signal in the next emitted pulse after the first-obtained photodetection signal is detected at least one time and controls said photodetection control circuit so that the photodetection signal obtained first can be detected except the restricted photodetection signal, one photodetection signal is detected by being discriminated for each emitted pulse, and distances to said one or more objects to be measured are individually measured based on the discriminated photodetection signal.

10. A distance measuring device according to claim 9, wherein said control arithmetic unit controls the number of detections of the photodetection signals from each object to be measured so that the results of detection of photodetection signals of one or more objects to be measured have deviations equal to or lower than a predetermined deviation respectively.

11. A distance measuring device according to claim 9, wherein said control arithmetic unit sets up a time width for photodetection restriction by detecting the photodetection signal and restricts the detection of said photodetection signal within the time width.

12. An electro-optical distance measuring method for measuring a distance to an object to be measured by receiving a reflected light from the object to be measured, comprising:

a step of projecting a laser beam which consists of pulses sequentially emitted with a predetermined spreading angle so as to include two or more objects to be measured;

a step of emitting a ready signal which enables the detection of the reflected light from the object to be measured;

a step of restricting detection of the reflected light before emission of the ready signal and of detecting at least one time the reflected light received first after the emission of the ready signal;

a step of emitting the mask signal to control the detection of the reflected light;

a step of controlling the timing of emission of a mask signal and discriminating and detecting for each emitted pulse the reflected light from said two or more objects to be measured; and a step of measuring distances to said two or more objects to be measured based on the results of detection of the discriminated reflected lights.

13. An electro-optical distance measuring method for measuring a distance to an object to be measured by receiving a reflected light from the object to be measured, comprising a preliminary measurement and a main measurement, wherein said preliminary measurement comprises:

a step of projecting a laser beam which consists of pulses sequentially emitted with a predetermined spreading angle so as to include two or more objects to be measured;

a step of setting a restriction time to restrict detection of the reflected lights and of detecting the reflected light received first after lapse of the restriction time to restrict detection;

a step of gradually increasing the restriction time to restrict detection of the reflected lights and of individually detecting the reflected lights from the two or more objects to be measured; and a step of measuring the restriction time to restrict detection when each of the reflected lights is individually detected;

and wherein said main measurement comprises:

a step of projecting a laser beam which consists of pulses sequentially emitted with a predetermined spreading angle so as to include said two or more objects to be measured;

a step of emitting a ready signal which enables the detection of the reflected light from the object to be measured based on the result of said preliminary measurement;

a step of restricting detection of the reflected light before emission of the ready signal and of detecting at least one time the reflected light received first after the emission of the ready signal;

a step of discriminating and detecting the reflected lights from said two or more objects to be measured for each emitted pulse by selecting the timing of the emission of the ready signal; and a step of measuring distances to said two or more objects to be measured based on the result of detection of the discriminated reflected lights.

14. An electro-optical distance measuring device, comprising a light source unit for emitting a laser beam which consists of pulses sequentially emitted having a predetermined spreading angle, a photodetection unit for receiving reflected lights from one or more objects to be measured, a photodetection control circuit, a distance measuring unit for acquiring measurement data on said object to be measured based on a first photodetection signal from said photodetection unit, and a control arithmetic unit for carrying out distance measurement by controlling said distance measuring unit and for calculating a distance based on the data obtained at said distance measuring unit, wherein said control arithmetic unit emits a ready signal which enables the detection of a reflected light from the object to be measured, restricts detection of the reflected light before emission of the ready signal, detects at least one time the reflected light received first after emission of the ready signal, controls said photodetection control circuit so that the timing of emission of the ready signal is controlled and the reflected lights from the two or more objects to be measured are discriminated for each emitted pulse and a photodetection signal is detected, and individually measures distances to one or more objects to be measured based on the discriminated photodetection signals.

15. An electro-optical distance measuring method for measuring a distance to an object to be measured by receiving a reflected light from the object to be measured, comprising:

a step of projecting a laser beam which consists of pulses sequentially emitted with a predetermined spreading angle so as to include two or more objects to be measured;

step of receiving the reflected lights from the two or more objects to be measured by a photodetection unit via the same optical path for each pulse of the pulsed laser beam;

a step of discriminating and detecting the reflected light from one of said two or more objects to be measured;

a step of discriminating and detecting the reflected lights from said two or more objects to be measured respectively; and a step of measuring distances to said two or more objects to be measured respectively based on the results of detection of the discriminated reflected lights;

wherein, in the detection of the reflected lights from said two or more objects to be measured, number of detections of the reflected lights from each object to be measured is set so that the results of the detection have deviations equal to or lower than a predetermined deviation respectively.

* * * * *